(12) United States Patent
Astigarraga et al.

(10) Patent No.: US 7,917,837 B2
(45) Date of Patent: Mar. 29, 2011

(54) PROVIDING A BLADE CENTER WITH ADDITIONAL VIDEO OUTPUT CAPABILITY VIA A BACKUP BLADE CENTER MANAGEMENT MODULE

(75) Inventors: Tara Lynn Astigarraga, Vail, AZ (US); David Franklin DeHaan, Tucson, AZ (US); Patricia J. Jeffalone, Tucson, AZ (US); Omolaoye Olatunde-Bello, Tucson, AZ (US); Shariffa B. Siewrattan, Tucson, AZ (US); Frances Bennett Tsingine, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 11/876,236

(22) Filed: Oct. 22, 2007

(65) Prior Publication Data

US 2009/0106805 A1    Apr. 23, 2009

(51) Int. Cl.
*G06F 11/00* (2006.01)
*H04L 1/00* (2006.01)
(52) U.S. Cl. .................... 714/799; 714/700
(58) Field of Classification Search .......... 709/208, 709/223; 714/4, 11, 13, 47, 700, 799
See application file for complete search history.

(56) References Cited

U.S. PATENT DOCUMENTS

| | | | |
|---|---|---|---|
| 6,915,362 B2 * | 7/2005 | Ramsey et al. | 710/62 |
| 7,139,861 B2 * | 11/2006 | Lee | 710/316 |
| 7,194,655 B2 * | 3/2007 | Chu et al. | 714/4 |
| 7,613,927 B2 * | 11/2009 | Holovacs | 713/182 |
| 7,657,677 B2 * | 2/2010 | Huang et al. | 710/100 |
| 2003/0051021 A1 * | 3/2003 | Hirschfeld et al. | 709/223 |
| 2004/0264398 A1 | 12/2004 | Chu et al. | 370/312 |
| 2005/0021654 A1 | 1/2005 | Kern et al. | 709/211 |
| 2005/0265385 A1 | 12/2005 | Cromer et al. | 370/466 |
| 2006/0095595 A1 | 5/2006 | Dalton et al. | 710/5 |
| 2006/0136704 A1 | 6/2006 | Arendt et al. | 713/2 |
| 2006/0190484 A1 | 8/2006 | Cromer et al. | 707/104.1 |
| 2006/0218631 A1 * | 9/2006 | Shih et al. | 726/8 |
| 2007/0058619 A1 | 3/2007 | Gopal Gowda et al. | 370/386 |
| 2008/0126627 A1 * | 5/2008 | Chandrasekhar et al. | 710/62 |

OTHER PUBLICATIONS

"The BladeCenter management dodule", no date, http://publib.boulder.ibm.com/infocenter/bladectr/documentation/topic/ 2 pages.*

* cited by examiner

*Primary Examiner* — Krisna Lim
(74) *Attorney, Agent, or Firm* — Hamilton & Terrile, LLP; Stephen A. Terrile

(57) ABSTRACT

A blade center is provided with an additional video output system which includes additional video output capabilities to allow a user to point to another blade within the blade center to work locally on a blade that does not include media tray access. The local access is granted via a control (e.g., a button) on the control panel of the blades or a control on the chassis or management module that allows the user to specify which blade to use for the second video output connection to a KVM console or direct host connect. This video output system advantageously allows more than one blade to be interactively utilized in a graphic environment at any time. Other blades executing local applications can be accessed and/or modified while another blade is accessing the media tray for installations and using one of the video output controls.

12 Claims, 3 Drawing Sheets

PROVIDING A BLADE CENTER WITH ADDITIONAL VIDEO OUTPUT CAPABILITY VIA A BACKUP BLADE CENTER MANAGEMENT MODULE

BACKGROUND OF THE INVENTION

1. Field of the Invention

The present invention relates in general to the field of computers and similar technologies, and in particular to blade systems. Still more particularly, the present invention relates to providing additional video output capability to a blade system.

2. Description of the Related Art

It is known to configure a plurality of computer systems within blade centers. In blade centers, a plurality of computer systems (i.e., blade servers, also referred to as blades) are connected across a backplane via a network switch.

Known blade centers only allow a single user to access a single blade via a keyboard, video and mouse (KVM) console or direct host connect at a time. This limitation can be an issue with larger blade centers where multiple users may wish to simultaneously access and work with the blades within the blade center. In known blade centers, much communication and organization is needed to share resources among the blades. For example, users are allowed to point a media button at one blade and a video output button at another blade. However in situations where an installation is occurring on one blade, the user doing an install on the media button blade looses visibility to their installation.

Users can also telnet into the blades to check status, however with no GUI interface, operating system interaction is not always user friendly. In known blade centers, an option to control the blades via a management module web interface also exists, however switching the blade in the web interface also changes the blade view via direct host connect or kvm console.

Accordingly, it would be desirable to provide a blade center with additional video output capability.

SUMMARY OF THE INVENTION

In accordance with the present invention, a blade center is provided with an additional video output system which includes additional video output capabilities to allow a user to point to another blade within the blade center to work locally on a blade that does not include media tray access. The local access is granted via a control (e.g., a button) on the control panel of the blades or a control on the chassis or management module that allows the user to specify which blade to use for the second video output connection to a KVM console or direct host connect. This video output system advantageously allows more than one blade to be interactively utilized in a graphic environment at any time. Other blades executing local applications can be accessed and/or modified while another blade is accessing the media tray for installations and using one of the video output controls. The access by a blade to the media tray is independent of video access such that a blade can have both the media tray and one (or possibly both) of the video outputs assigned to it.

More specifically, in one embodiment, the invention relates to a computer-implementable method comprising: providing a blade system with a first video output system included within a first management module and a second video output system included within a backup management module; coupling the first video output system to a first blade within the blade system to provide first video output, the first video output signal presenting information generated by the first blade within the blade system; and, coupling the second video output system to another blade within the blade system to provide a second video output signal, the second video output signal presenting information generated by the other blade within the blade system.

Accordingly, the additional video output system allows for the simultaneous use of media tray access by one blade and two other video output connections by an additional two blades.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
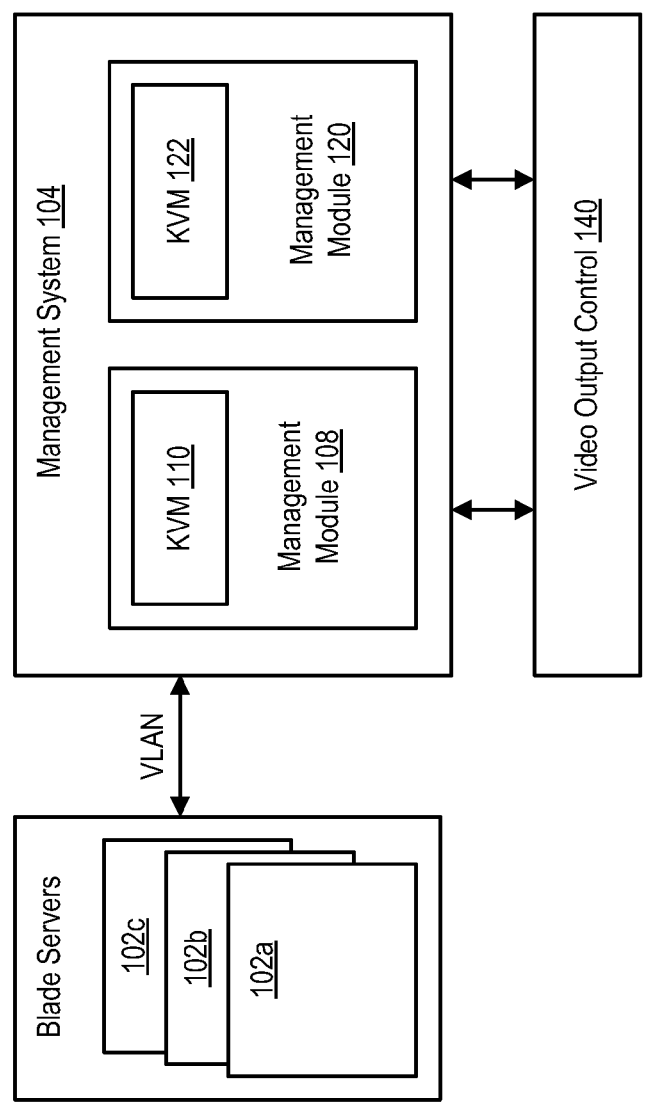
FIG. 1 shows a block diagram of a blade system in accordance with the present invention.

Referring to FIG. 1, a block diagram of a blade system 100 is shown. The blade system 100 comprises a plurality of blade servers 102a-102c managed by a management system 104. The blade servers 102a-102c and the management system 104 communicate via a bus according to the Virtual Local Area Network (VLAN) protocol. The management system 104 comprises a management module 108. The management module 108 manages communication between the blade servers 102a-102c. The management module 104 comprises a keyboard, video and mouse (KVM) module 110.

The blade system 100 comprises an additional backup management module 120, which includes an additional KVM module 122. The additional management module 120 allows kvm console or direct host connect access to an additional blade chosen via the second video output control (e.g., a video output button) on the bladecenter chassis, management module or blade. The additional backup management module 120 provides a failover functionality as well as additional video functionality. Thus, if additional video output is desired, the backup management module 120 can provide this video output. The management system 104 also includes a video output control module 140.

The video output control module 140 may implemented in a variety of ways including, but not limited to adding an additional button on the chassis below each blade slot, an additional button on each blade, or by adding a video output button to the chassis and providing a plurality keypad or scroll choices representing each blade. The additional management module 120 along with a video output control module 140 provides an additional video output system 150. Thus the blade system 100 comprises at least two management modules as well as two video output connections via either direct host connections or kvm consoles.

Figure 2:
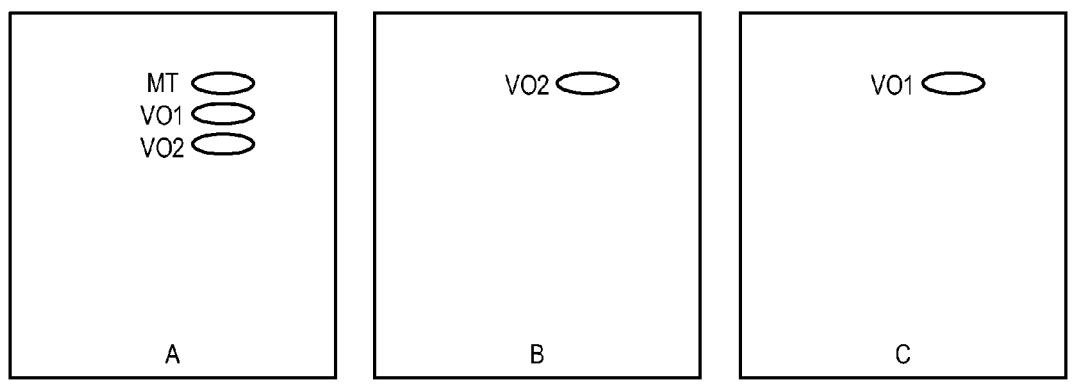
FIG. 2 shows a block diagram of rear panels of a plurality of blades within a blade system operating with a video output (VO) system.

For example, referring to FIG. 2, a block diagram of rear panels of a plurality of blades within a blade system operating with a video output (VO) system is shown. More specifically, the additional video output system 150 allows control of an additional video output. For example, the additional video output control is provided on the blade system 100 chassis in a location such as a media center tray or onto the control panel of each blade.

The additional management module 120 grants additional video output access for a second blade. The additional video access is a relatively seamless connection for the users; however, when using the additional video output, the management modules 108, 120 within the blade system 100 are set to operate in an active/active or active/silently active environment as opposed to a default setup of an active/failover environment. In certain embodiments, a distinct Internet Protocol (IP) address may be defined for the additional management module 120. Additionally, a second video indicia is provided to the second management module to denote a current mode of operation of the second management module. E.g., the second video indicia indicates whether the additional management module 120 is operating in an active mode of operation or a silently active mode of operation.

Additionally, should a management module failover operation be required, a failover mode of operation for the second management module takes priority over the additional video function. Thus the additional video output access is temporarily suspended until the first management module 108 is back on-line and functioning.

Figure 3:
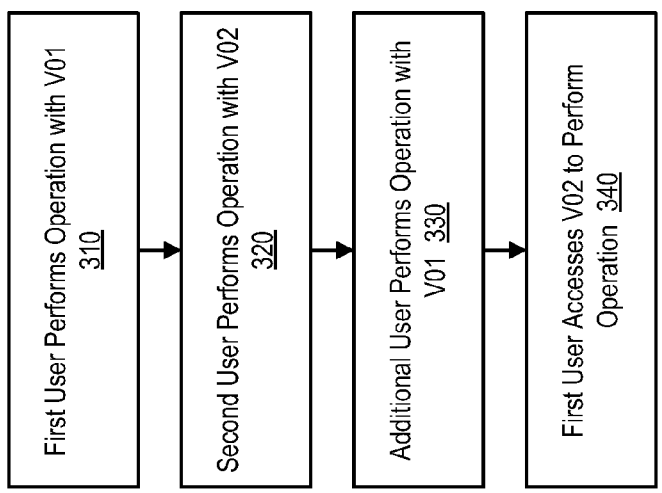
FIG. 3 shows a flow chart of the operation of an additional video system.

For example, referring to FIG. 3, a flow chart of the operation of a blade system 100 when the additional video output system is present is shown. More specifically, if a first user is performing an install operation using a media tray (i.e., a tray within the blade system 100 which provides user access to the management module 108) and the first video output (VO1), this operation would be so indicated via the controls of the rear of blade A at step 310. Next, if a second user is setting up an input/output module of the blade system 100 using the second video output (VO2) of blade b, this operation is indicated via the controls of the rear panel of blade B at step 320. Next, if a third user wishes to perform some type of operation on Blade C and the previous user of the output capabilities of video output 1 no longer requires this function, then the user can choose to access the video output capabilities of video output V01 at step 330. Additionally, if the first user then requires access to a video output, but the video output function is still occupied by the third user, then the first user can access the additional video output VO2 to complete the install operation at step 340. Thus, within the blade system 100 multiple users may simultaneously and seamlessly access a video output functionality via the additional video output system 150.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method comprising:
   providing a blade system with a first video output system included within a first management module and a second video output system included within a backup management module;
   coupling the first video output system to a first blade within the blade system to provide first video output, the first video output signal presenting information generated by the first blade within the blade system;
   coupling the second video output system to another blade within the blade system to provide a second video output signal, the second video output signal presenting information generated by the other blade within the blade system;
   operating the second management module in a silently active mode of operation;
   determining whether a failure occurs within the first management module; and,
   setting the second management module to operate in an active mode of operation if a failure occurs within the first management module.

2. The computer-implementable method of claim 1 wherein:
   the first video output system is included within a first keyboard, video, mouse (KVM) module; and,
   the second video output system in included within a second keyboard, video, mouse (KVM) module.

3. The computer-implementable method of claim 1 further comprising:
   the second management module operates with the silently active mode of operation or the active mode of operation based upon a additional video indicia.

4. The computer-implementable method of claim 1 wherein:
   the blade system comprises a plurality of blades; and,
   the second video output system is controllable via a second video output control, the second video output control determining to which of the plurality of blades the second video output system is coupled.

5. A blade system comprising:
   a plurality of blades, each of the plurality of blades comprising
   a processor;
   a data bus coupled to the processor; and
   a memory coupled to the data bus;
   a management system coupled to the plurality of blades, the management system comprising
   a processor;

a data bus coupled to the processor;

a first management module, the first management module comprising a first video output system;

a backup management module, the backup management module comprising a second video output system; and, a computer usable medium embodying computer program code, the computer usable medium being coupled to the data bus of the management system, the computer program code comprising instructions executable by the processor of the management system and configured for:

coupling the first video output system to a first blade within the blade system to provide first video output, the first video output signal presenting information generated by the first blade within the blade system;

coupling the second video output system to another blade within the blade system to provide a second video output signal, the second video output signal presenting information generated by the other blade within the blade system;

operating the second management module in a silently active mode of operation;

determining whether a failure occurs within the first management module; and setting the second management module to operate in an active mode of operation if a failure occurs within the first management module.

6. The system of claim 5 wherein:

the first video output system is included within a first keyboard, video, mouse (KVM) module; and, the second video output system in included within a second keyboard, video, mouse (KVM) module.

7. The system of claim 5 wherein:

the second management module operates in the silently active mode of operation or the active mode of operation based upon a additional video indicia.

8. The system of claim 5 wherein:

the second video output system is controllable via a second video output control, the second video output control determining to which of the plurality of blades the second video output system is coupled.

9. A non-transitory computer-usable medium embodying computer program code, the computer program code comprising computer executable instructions configured for:

coupling a first video output system included within a first management module to a first blade within a blade system to provide first video output, the first video output signal presenting information generated by the first blade within the blade system;

coupling a second video output system included within a backup management module to another blade within the blade system to provide a second video output signal, the second video output signal presenting information generated by the other blade within the blade system;

operating the second management module in a silently active mode of operation;

determining whether a failure occurs within the first management module; and, setting the second management module to operate in an active mode of operation if a failure occurs within the first management module.

10. The non-transitory computer-usable medium of claim 9 wherein:

the first video output system is included within a first keyboard, video, mouse (KVM) module; and, the second video output system in included within a second keyboard, video, mouse (KVM) module.

11. The non-transitory computer-usable medium of claim 9 wherein the computer executable instructions are further configured for:

operating the second management module with the silently active mode of operation or the active mode of operation based upon an additional video indicia.

12. The non-transitory computer-usable medium of claim 11 wherein:

the second video output system is controllable via a second video output control, the second video output control determining to which of the plurality of blades the second video output system is coupled.

* * * * *